H. R. HASKELL.
ANIMAL FEED BAG.
APPLICATION FILED NOV. 17, 1910.

1,007,002.

Patented Oct. 24, 1911.

Witnesses
H. A. Stock.
H. C. Schroeder

Inventor
Herbert R. Haskell
By E. E. Vrooman, Attorney

UNITED STATES PATENT OFFICE.

HERBERT R. HASKELL, OF OAKLAND, CALIFORNIA.

ANIMAL FEED-BAG.

1,007,002. Specification of Letters Patent. Patented Oct. 24, 1911.

Application filed November 17, 1910. Serial No. 592,895.

*To all whom it may concern:*

Be it known that I, HERBERT R. HASKELL, a citizen of the United States, residing at Oakland, in the county of Alameda and State of California, have invented certain new and useful Improvements in Animal Feed-Bags, of which the following is a specification.

This invention relates to feed bags and has for its object to provide an improved feed bag so constructed that the feed will be brought within reach of the animal's mouth and at the same time the animal is permitted to freely raise its head and move its mouth away from the feed.

Another object of the invention is economy of feed as by means of this invention the horse will not toss his head in an endeavor to reach the food, and thereby scatter the feed nor blow violently and scatter the feed in an effort to clear his nostrils of particles of dust.

Another object of this invention is to provide a feed bag which will retain its shape when in use and which may be folded.

Figure 1:
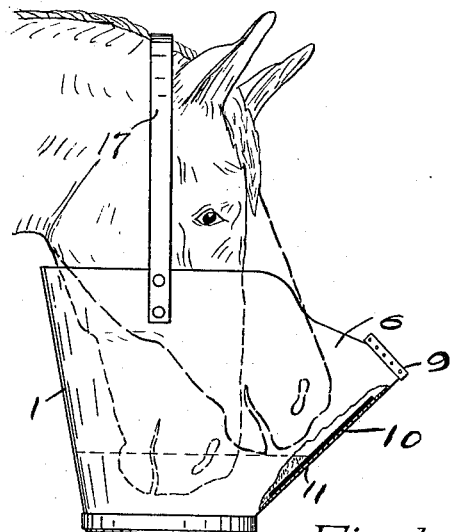
Figure 2:
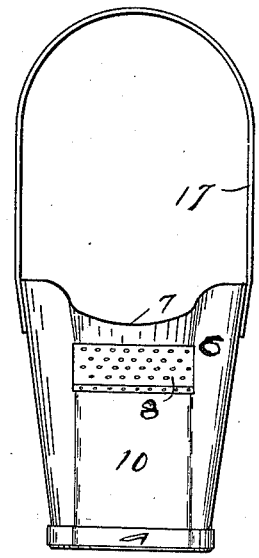
Figure 6:
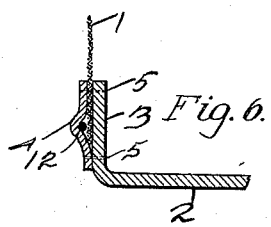
Figures 3, 4:
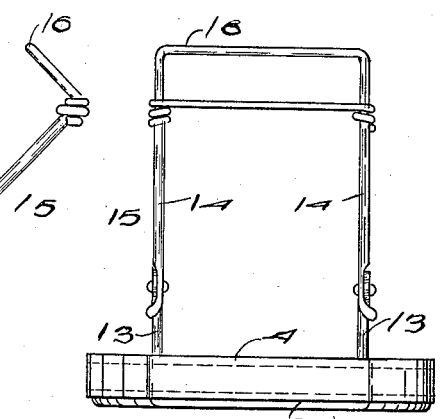
Figure 5:
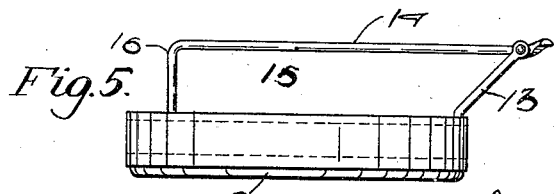

Referring to the accompanying drawing: Figure 1 is a view of a feed bag constructed in accordance with this invention and shown attached to a horse's head. Fig. 2 is a front view of the feed bag. Fig. 3 is a side view of the bottom of the bag and a supporting frame with the fabric of the bag removed. Fig. 4 is a front view of the parts shown in Fig. 3. Fig. 5 is a side view thereof in folded position. Fig. 6 is a detached view of a portion of the bottom of the bag in section.

In carrying out the invention a feed bag 1 of canvas or other suitable material is provided having a bottom 2 of any suitable material and preferably of leather in the form of a shallow pan with an annular vertical flange 3 to which the lower end of the bag is secured in any suitable manner and preferably by securing it thereto, clamped between the flange 3 and a leather ring 4, the leather ring 4 and the lower edge of the bag being secured to the flange 3 of the bottom 2 by the double rows of stitching 5. The bag is formed with a front inclined chambered portion 6 partly closed at the top and having a curved opening 7 in its top to permit a horse to raise his head to the elevated position, shown in Fig. 1. The outer end of the inclined portion 6 is formed with an opening in which is secured a perforated plate 8 attached to a ring 9 mounted on the edge of said opening. The perforated plate serves to ventilate the inclined portion 6. The front inclined face 10 of the bag is reinforced on the inside by a piece of leather 11 to prevent wear on the bag by the constant rubbing of the horse's nose on the bag. To cause the bag to retain its shape, when in use, a suitable frame is provided, as for example, a frame consisting of a rod bent to form a ring 12 which is located between the annular band and the flange 3, the rod being extended from the ring 12 at the lower end of the inclined front portion 6 to form two inclined arms 13 to which are hinged the ends of the arms 14 of an inverted U-shaped frame 15 having an inclined transverse portion 16, said frame being secured to the fabric of the front inclined portion 6 in any suitable manner, and serving to hold the same in extended position. By means of this construction the inclined front portion of the bag may be folded with the hinged frame into the main portion of the bag.

It will be readily seen that by means of a feed bag constructed in accordance with this invention the horse has free use of his head, as shown in full and dotted lines in Fig. 1, and also can snort or blow and take breath without being impeded by the feed, thereby avoiding scattering the feed. The bag is provided with the usual form of strap 17 for suspending the bag from the horse's head.

Having described the invention, what I claim is:

1. A feed bag formed with a front inclined chambered portion provided with a supporting frame hinged to the bottom of the bag, and foldable with said frame into the main portion of the bag.

2. A feed bag formed with an inclined front chambered portion with a top having a curved recess forming an extension of the opening of the top of the feed bag, and a supporting frame hinged to the bottom of the bag located in said front extended portion, and foldable therewith into the main portion of the feed bag.

3. A feed bag formed with a front inclined chambered portion with a closed top provided with a curved recess forming an extension of the opening in the top of the bag, and a ventilator in said top, and a frame hinged to the bottom of the bag mounted within said front extended portion and foldable therewith into the main portion of the feed bag.

4. A feed bag formed with an inclined extended front chambered portion having a curved top with a curved recess forming an extension of the main opening in the top of the bag, a rigid bottom mounted in said feed bag, a rod extending about the periphery of said bottom and formed with inclined projections located in the lower end of the front extended portion of the bag, and a frame hinged to said extensions, and supporting said extended portion and foldable therewith into the main portion of the bag.

In testimony whereof I affix my signature in presence of two witnesses.

HERBERT R. HASKELL.

Witnesses:
H. C. SCHROEDER,
F. J. SCHROEDER.

Copies of this patent may be obtained for five cents each, by addressing the "Commissioner of Patents, Washington, D. C."